Patented Nov. 10, 1936

2,060,086

UNITED STATES PATENT OFFICE 2,060,086

PRODUCTION OF CARBONYLIC COMPOUNDS

Carl T. Kautter, Berkeley, Calif.

No Drawing. Application December 24, 1934, Serial No. 758,889

20 Claims. (Cl. 260—134)

This invention relates to a process for the conversion of unsaturated organic compounds to useful carbonylic compounds which comprises causing an unsaturated compound possessing an unsaturated tertiary carbon atom to react with a halogen and water or their equivalents, said reaction being effected at a superatmospheric pressure and a temperature substantially greater than 100° C.

The invention provides a practical, economical and broadly applicable method for the conversion of tertiary olefines primarily to saturated compounds of the class consisting of aldehydes and ketones. My process comprises the single step of contacting an unsaturated compound with a halogen and water under conditions of temperature and pressure at which the unsaturated compound is primarily oxidized to the corresponding aldehyde or ketone. An advantageous feature of my process is inherent in its applicability to a continuous mode of operation. For example, a suitable unsaturated compound and chlorine or bromine may be continuously or intermittently introduced into a suitable reaction vessel containing water maintained at the desired temperature and the reaction product continuously removed by some suitable method, such as distillation, from the reaction system substantially as soon as it is formed therein.

My invention is preferably executed with those unsaturated compounds of olefinic character which contain an unsaturated tertiary carbon atom such as tertiary butylene, the tertiary amylenes, hexylenes, heptylenes, octylenes and the like as well as their unsaturated polymers, homologues, analogues and suitable substitution products. The unsaturated compound may comprise an iso unsaturated alkyl chain which may or may not be linked to a cyclic radical as of the aromatic, alicyclic and heterocyclic series, or the chain may comprise part of an alicyclic structure.

I may employ the unsaturated compounds severally or mixtures comprising a plurality of species of unsaturated compounds may be treated and a mixture of carbonylic compounds obtained. The olefinic compounds may be applied in a pure state or in admixture with a relatively inert substance. Mixtures of olefines with paraffin hydrocarbons may be advantageously employed. Such mixtures may be obtained by the pyrogenesis or cracking of petroleum oil, shale oil and petroleum products and by the destructive distillation of coal, peat, pitches, asphalts and related carbonaceous materials.

In utilizing cracked petroleum distillates, it may be desirable to fractionate the same into fractions containing hydrocarbons which, for the most part, contain the same number of carbon atoms to the molecule. A typical fraction of this sort is the butane-butene cut which usually contains normal butane, isobutane, buten-1, buten-2, isobutylene and sometimes small amounts of diisobutylene. If desired, the tertiary olefines, or a particular tertiary olefine, may be separated from such a cut or the original mixture by fractionation, condensation, extraction and the like means. The use of a pure or substantially pure tertiary olefine facilitates the recovery of pure products and in some cases permits better control of the reaction whereby the formation of undesirable by-products is substantially avoided.

The invention is executed preferably in the presence of a relatively large excess of water over the unsaturated compound and halogen present in the reaction mixture. The reaction preferably is executed in the liquid phase under acid conditions at a temperature preferably in the range of from about 140° C. to 250° C. under a pressure equal to the combined vapor pressures of the constituents under the temperature of operation. The reaction presumably proceeds in accordance with the mechanism represented by the equation for the specific reaction of isobutylene with chlorine and water in accordance with my invention:

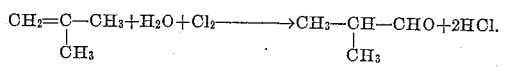

The liberated hydrogen halide dissolves in the aqueous reaction mixture rendering it sufficiently acidic to permit the reaction to proceed rapidly and completely. It appears that the invention is best executed in a relatively dilute aqueous acid medium. This object may be attained in a wide variety of suitable manners. I may continuously or intermittently withdraw a portion of the aqueous solution from the reaction vessel and continuously or intermittently introduce water in an amount sufficient to maintain the acid concentration substantially constant. Alternatively, the excess of hydrogen halide may be neutralized by continuously introducing a suitable basic or basic-reacting substance into the reaction vessel. Excellent results may be obtained by conducting the reaction in the presence of a suitable metal carbonate; the alkaline earth metal carbonates being particularly suitable for my purpose. For example, the conversion may be advantageously effected in the presence of $CaCO_3$. Although $CaCO_3$ acts as a neutralizing agent, the reaction nevertheless proceeds under acidic conditions. The alkaline earth metal carbonates being substantially insoluble in water act as neutralizing agents only as fast as they can be dissolved by the reaction:

$$2HCl + CaCO_3 \rightarrow CaCl_2 + CO_2 + H_2O.$$

The reaction occurs only on the surface of the $CaCO_3$ and the liquid between the particles will be acidic due to the hydrogen halide liberated by the conversion reaction. In addition, the liberated $CO_2$, under the pressure in the system, dissolves in the reaction mixture and aids in keeping the mixture acidic. This mode of procedure may be particularly advantageous when it is desired to operate under relatively high pressures.

When necessary or desirable, the reaction may be initiated or accelerated by adding an acid to the reaction mixture. Suitable substances for this purpose include the mineral acids and acid-acting salts as well as substances capable of forming or acting as mineral acids under the conditions of operation.

In general, the rate of the reaction is dependent on the acid strength of the reaction mixture and the reaction temperature. Accordingly, if the acid concentration is kept low, higher temperatures should be employed to maintain the same rate of reaction. In the majority of cases, I prefer to operate with reaction mixtures wherein the acid concentration titratable as free hydrogen halide, is from about 0.5 N to 2.5 N. Higher acid concentrations may be resorted to when it is desired to accelerate the reaction in the preferred temperature range, but ordinarily, when higher acid concentrations are employed there is a material decrease in yield of the desired carbonylic compound due to the formation of undesirable polymerization and condensation products.

My invention may be executed in any suitable apparatus wherein the reaction may be suitably controlled and unsaturated compounds converted to carbonylic compounds in accordance with the method herein described. In a preferred mode of operation, the unsaturated compound and a halogen are simultaneously introduced into a large excess of water which is maintained at the desired temperature and pressure in a reaction vessel preferably equipped with heating means and means for agitating its contents as by mechanical stirring. The unsaturated compound and the halogen may be introduced simultaneously in equimolecular amounts into the reactor or the halogen may be introduced into the aqueous mixture or solution of unsaturated compound. Further, the halogen may be employed in the form of an aqueous solution. Generally, it is desirable to maintain an excess of the unsaturated compound in the reaction zone. Water alone, or in solution or admixture with the other reactants may be continuously or intermittently added in an amount sufficient to compensate for that consumed during the reaction and removed with the reaction product.

The reaction products formed are in general polymerized or otherwise undesirably affected on prolonged contact with the acidic reaction mixture under reaction conditions. These side reactions may be substantially avoided by operating in such a manner that the carbonylic compounds are removed from the reaction mixture substantially as soon as they are formed therein. In a preferred mode of operation, I may effect rapid removal of the reaction product by distilling the same from the reaction mixture at such a rate that its substantial accumulation in the system is avoided. This preferred method is applicable in the majority of cases, since the boiling temperature of the carbonylic compound or its azeotropic mixture with water and/or other constituents of the reaction mixture is usually lower than the boiling temperature of the aqueous reaction mixture. The reaction product and water may be distilled under pressure from the reaction vessel at any desired rate.

The carbonylic compounds may be readily recovered by condensing the vapors removed from the reaction vessel. The condensate which usually contains the reaction product, water and, in some cases, other volatile constituents of the reaction mixture may be used as such for solvent and the like purposes or the reaction product or products may be separated therefrom by any suitable means such as stratification, extraction, distillation, use of drying agents, etc.

The nature of the product obtained will be dependent on the structure of the unsaturated compound reacted. Unsaturated compounds containing a primary unsaturated carbon atom will yield predominantly an aldehyde. Compounds containing only unsaturated secondary, tertiary or secondary and tertiary carbon atoms will predominantly yield ketones. When mixtures of different species of unsaturated compounds are reacted, mixtures of aldehydes and ketones may be obtained.

The following examples are introduced for the purpose of illustrating a mode of procedure and indicating the type of carbonylic compounds which may be obtained when specific unsaturated compounds are reacted in accordance with the principles of my invention. It is to be understood that these examples are intended for illustration only and that I do not thereby limit my invention.

Example I

Chlorine gas and a molecular excess of isobutylene were slowly introduced into the kettle of a pressure still containing water at a temperature of about 100° C., while the contents of the kettle were violently agitated by means of a mechanical stirrer. It was found that isobutyraldehyde, isobutylene chlorhydrin, isobutenyl chloride and other products were formed.

Under the conditions of this example isobutyraldehyde was definitely formed while at the same time it is known that when the reaction is carried out at ordinary temperatures, none or at most only traces of this material are formed, accordingly, I prefer to execute my invention at temperatures above 100° C.

Example II

The amylene of the formula

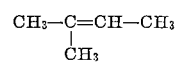

can be converted to a carbonylic end-product predominantly comprising methyl isopropyl ketone by introducing the amylene and chlorine in the ratio of 1.1 to 1.0 mols, respectively, through separate conduits into a relatively large volume of water maintained in the liquid phase at about 160° C. The reaction product may be distilled from the reaction mixture substantially as soon as it is formed therein.

The condensed distillate will usually contain the carbonylic end-product and an excess of water. The reaction product can be readily recovered therefrom by allowing the distillate to stratify and separating, drying and fractionating the non-aqueous layer. Isopropyl methyl ketone may be obtained in yields of about 65%.

*Example III*

Isobutylene can be converted to isobutyraldehyde in accordance with my invention by adding it with chlorine in the molal ratio of about 1.1 to 1.0 to a relatively large volume of water contained in a pressure still and kept at a temperature of about 155° C. with the system under a gauge pressure of about 75 lbs./sq. in.

The reaction product, along with water, may be distilled from the reaction mixture substantially as soon as it is formed therein.

The reaction product may be recovered from the condensed distillate by allowing it to stratify and separating, drying and fractionating the non-aqueous layer. Isobutyraldehyde may be obtained in yields up to about 85%.

The carbonylic compounds obtained by my method may be used for a wide variety of solvent and extraction purposes, or they may be used as intermediates in the preparation of many useful organic compounds. For example, they may be oxidized to carboxylic acids or they may be used to introduce alkyl groups into organic compounds by condensation or by the use of metallo organic derivatives.

The term "tertiary olefine" is used herein and in the appended claims to designate those olefines which on hydration yield tertiary alcohols or tertiary alcohol derivatives. The tertiary olefines are characterized by the inclusion in their structure of an unsaturated tertiary carbon atom. An unsaturated tertiary carbon atom is defined as a carbon atom which is unsaturated and linked to three other carbon atoms. For example, in the structural formula of isobutylene

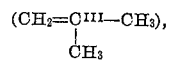

the $C^{III}$ carbon atom is tertiary; it is linked to one carbon atom by a double bond and to two other carbon atoms by single bonds.

While I have in the foregoing described in some detail the preferred embodiments of my invention and some variants thereof, it will be understood that this is only for the purpose of making the invention more clear and that the invention is not to be regarded as limited by the details of operation herein described nor is it dependent upon the soundness or accuracy of the theories advanced as to the advantageous results attained. On the other hand, the invention is to be regarded as limited only by the terms of the accompanying claims, in which it is my intention to claim all novelty inherent therein as broadly as possible in view of the prior art.

I claim as my invention:

1. A process for the conversion of unsaturated compounds to valuable carbonylic compounds which comprises reacting a hydrocarbon containing an olefinic linkage between two aliphatic carbon atoms, at least one which is tertiary, with a halogen and water at a temperature substantially greater than about 100° C.

2. A process for the conversion of unsaturated compounds to valuable carbonylic compounds which comprises effecting the liquid phase reaction of a hydrocarbon possessing an olefinic linkage between two aliphatic carbon atoms, at least one of which is tertiary, with a halogen and a substantial excess of water at a superatmospheric pressure and a temperature substantially greater than 100° C.

3. A process for the conversion of unsaturated compounds to valuable carbonylic compounds which comprises effecting the liquid phase reaction of a hydrocarbon possessing an olefinic bond between two aliphatic carbon atoms at least one of which is tertiary with a halogen and an excess of water at a temperature in the range of from about 140° C. to 250° C., and removing the carbonylic end-product substantially as soon as it is formed.

4. A process for the conversion of unsaturated compounds to valuable carbonylic compounds which comprises effecting the liquid phase reaction of a hydrocarbon possessing an olefinic bond between two aliphatic carbon atoms, only one of which is tertiary, with a halogen and an excess of water at a temperature of from about 140° C. to 250° C., and removing the carbonylic end-product substantially as soon as it is formed.

5. A process for the conversion of unsaturated compounds to valuable carbonylic compounds which comprises effecting the liquid phase reaction of a hydrocarbon possessing an olefinic bond between two aliphatic carbon atoms, at least one of which is tertiary, with chlorine and an excess of water in the presence of a metal carbonate at a temperature substantially greater than 100° C.

6. A process for the conversion of unsaturated compounds to valuable carbonylic compounds which comprises effecting the liquid phase reaction of a tertiary olefine with a halogen and an excess of water at a temperature substantially greater than 100° C.

7. A process for the conversion of unsaturated compounds to valuable carbonylic compounds which comprises effecting the liquid phase reaction of a tertiary olefine with a halogen and an excess of water at a temperature of from about 140° C. to 250° C. and under a superatmospheric pressure.

8. A process for the conversion of unsaturated compounds to valuable carbonylic compounds which comprises effecting the liquid phase reaction of a tertiary olefine with a halogen and a substantial excess of water at a temperature substantially greater than 100° C., while removing the carbonylic end-product substantially as soon as it is formed.

9. A process for the conversion of unsaturated compounds to valuable carbonylic compounds which comprises effecting the liquid phase reaction of a tertiary olefine with chlorine and a substantial excess of water at a superatmospheric pressure and a temperature in the range of from about 140° C. to 250° C., while removing the carbonylic end-product substantially as soon as it is formed.

10. A process for the conversion of unsaturated compounds to valuable carbonylic compounds which comprises effecting the liquid phase reaction of a tertiary olefine with a halogen and a substantial excess of water in the presence of a metal carbonate at a temperature substantially greater than 100° C.

11. A process for the conversion of unsaturated compounds to valuable carbonylic compounds which comprises effecting the liquid phase reaction of a tertiary olefine with a halogen and a substantial excess of water in the presence of an alkaline earth metal carbonate at a temperature substantially greater than 100° C.

12. A process for the conversion of unsaturated compounds to valuable carbonylic compounds which comprises effecting the liquid phase reaction of a tertiary olefine with a halogen and a substantial excess of water in the presence of CaCO3 at a temperature substantially greater than 100° C.

13. A process for the production of a carbonylic reaction product predominantly containing an aldehyde which comprises effecting the liquid phase reaction of a tertiary olefine containing an unsaturated primary carbon atom with a halogen and a substantial excess of water at a temperature substantially greater than 100° C.

14. A process for the production of a carbonylic reaction product predominantly containing a ketone which comprises effecting the liquid phase reaction of a tertiary olefine, the unsaturated carbon atoms of which are linked to at least three other carbon atoms with a halogen and a substantial excess of water at a temperature substantially greater than 100° C.

15. A process for the production of saturated carbonylic compounds which comprises effecting the liquid phase reaction of a tertiary olefine with chlorine and water under acid conditions in the presence of CaCO3 at a superatmospheric pressure and at a temperature of from about 140° C. to 250° C., while maintaining a substantial excess of water in the reaction system.

16. A process for the production of isobutyraldehyde which comprises effecting in the liquid phase the reaction of isobutylene with chlorine and a substantial excess of water at an elevated pressure and at a temperature of from about 140° C. to 250° C.

17. A process for the production of methyl isopropyl ketone which comprises effecting in the liquid phase the reaction of 2-methyl butene-2 with chlorine and a substantial excess of water at an elevated pressure and at a temperature of from about 140° C. to 250° C.

18. A process for the production of valuable carbonylic compounds which comprises reacting a liquid mixture containing at least one olefine possessing an unsaturated carbon atom linked to three other carbon atoms with a halogen and an excess of water at a superatmospheric pressure and a temperature greater than 100° C.

19. A process for the production of a mixture of valuable carbonylic compounds which comprises reacting a liquid mixture of dissimilar tertiary olefines with a halogen in the presence of a relatively large excess of water at a superatmospheric pressure and a temperature greater than 100° C.

20. A process for the production of a valuable carbonylic compound which comprises effecting the liquid phase reaction of an unsaturated hydrocarbon containing a double bond between two aliphatic carbon atoms, at least one of which is tertiary, with a halogen in the presence of a substantial excess of water under a superatmospheric pressure and a temperature greater than 100° C., while maintaining the concentration of hydrogen halide in the reaction mixture at from about 0.5 to about 2.5 expressed in terms of normal solutions.

CARL T. KAUTTER.